3,454,833
CURRENT LIMITER DEVICE-THYRISTOR CURRENT LIMITING STATIC CIRCUIT BREAKER
Ralph L. Hurtle, West Hartford, Conn., assignor to General Electric Company, a corporation of New York
Filed Aug. 16, 1967, Ser. No. 660,982
Int. Cl. H02h 9/00, 7/00; H01h 61/00
U.S. Cl. 317—20                                         18 Claims

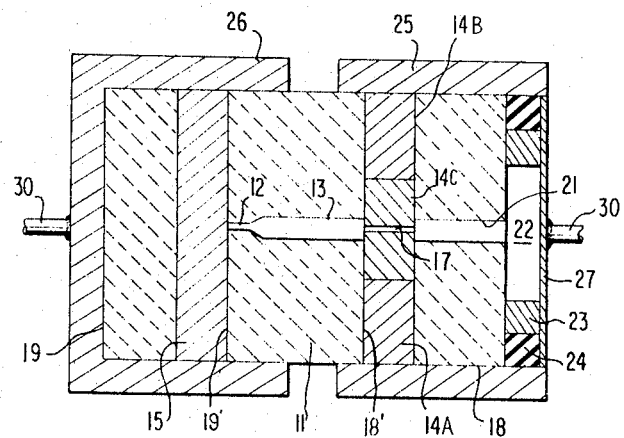
FIG.1
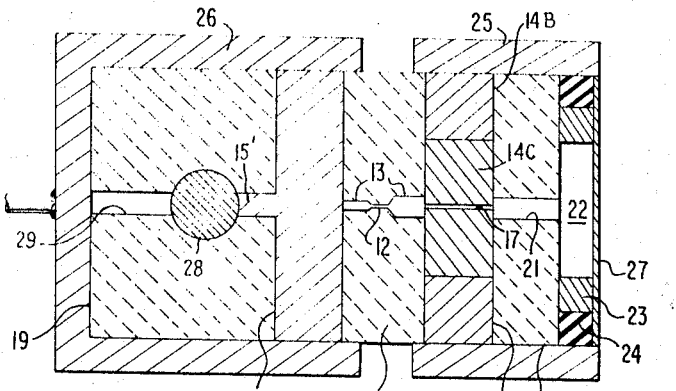
FIG.2
FIG.3
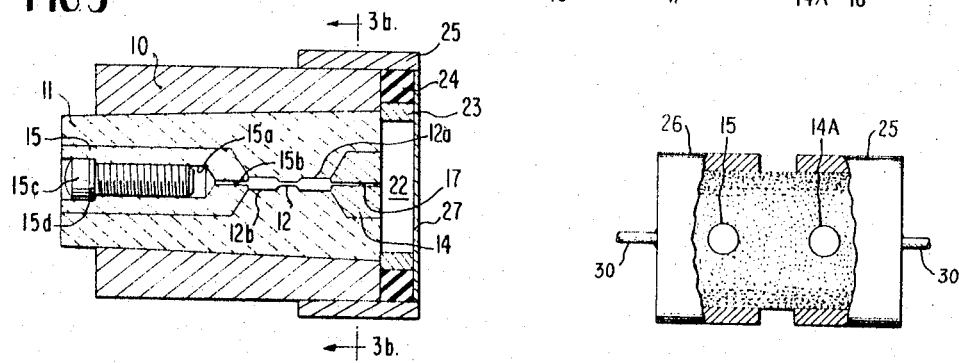
FIG.1A
FIG.4
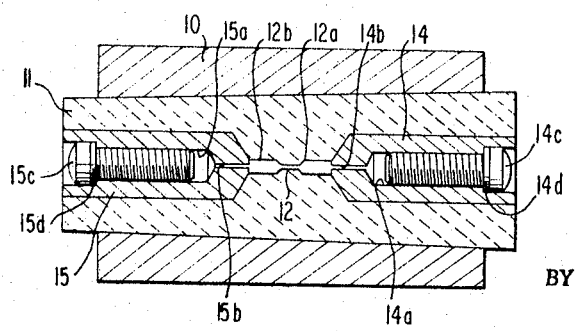
INVENTOR
RALPH L. HURTLE
Robert H. Casey
BY
ATTORNEY

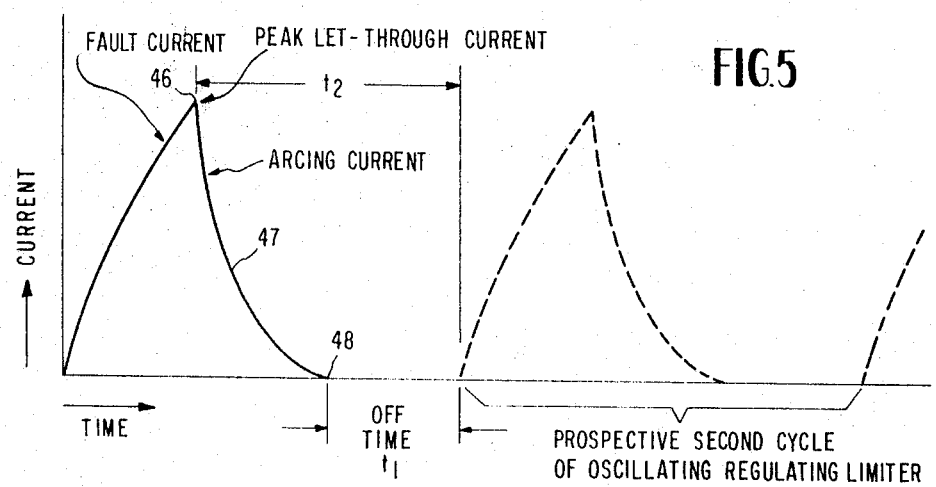
FIG.5
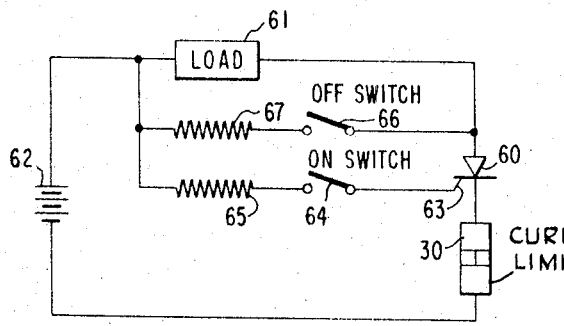
FIG.6
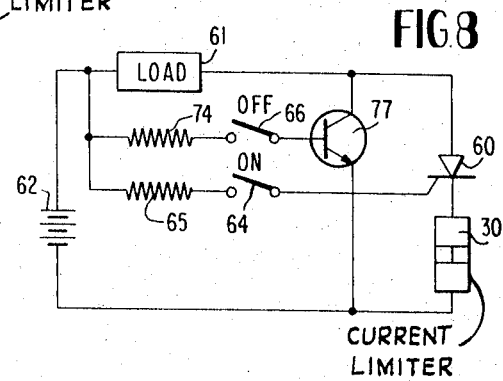
FIG.8
FIG.7
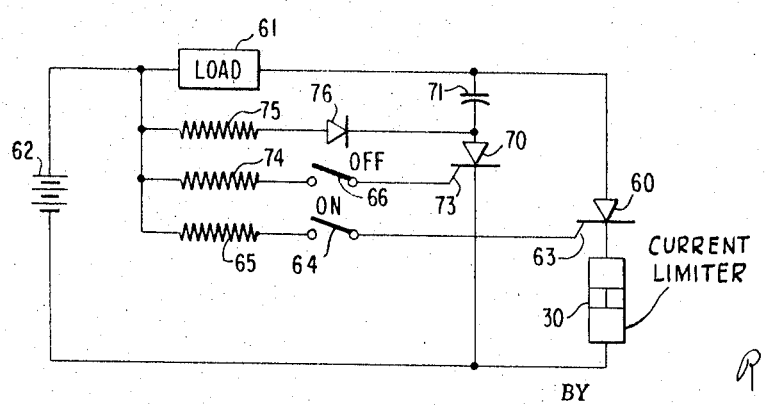
INVENTOR
RALPH L. HURTLE
BY
ATTORNEY July 8, 1969 R. L. HURTLE 3,454,833
CURRENT LIMITER DEVICE-THYRISTOR CURRENT
LIMITING STATIC CIRCUIT BREAKER
Filed Aug. 16, 1967 Sheet 3 of 3
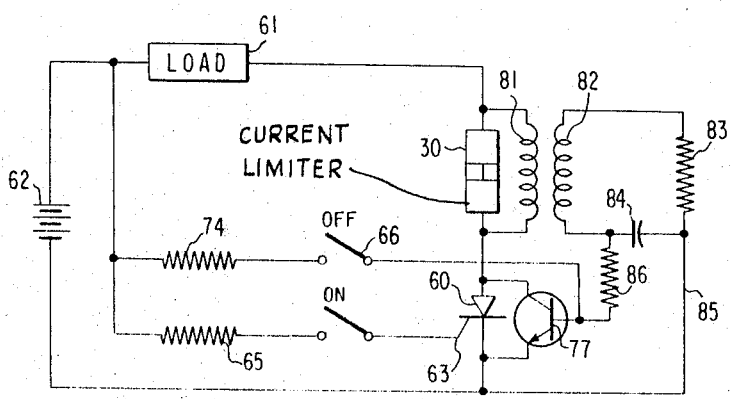
FIG.9
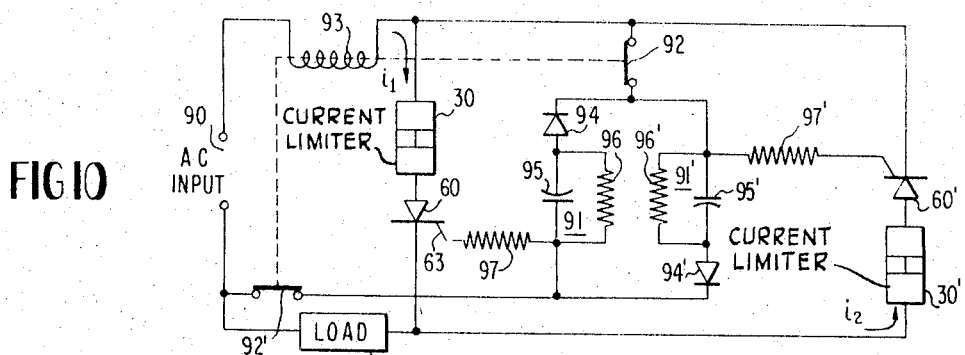
FIG.10
FIG.11
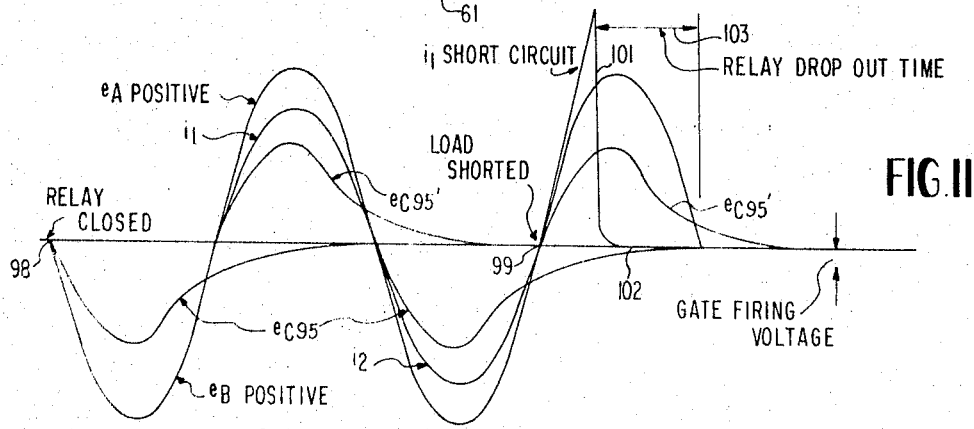
FIG.12
INVENTOR
RALPH L. HURTLE
BY Robert N. Casey
ATTORNEY United States Patent Office 3,454,833
Patented July 8, 1969

ABSTRACT OF THE DISCLOSURE

A current limiting circuit breaker, including an electronic control device which maintains conducting condition so long as current therethrough is above a predetermined "holding" magnitude, combined with a self-restoring vaporizable conductor current limiting device which, upon the occurrence of excessive current, changes its impedance characteristics and reduces the current below said holding magnitude long enough to cause the control device to revert to its non-conducting condition; special forms of current limiting devices having protracted periods of high impedance as well as manual on-off switching means and alternating current forms are also disclosed.

BACKGROUND OF THE INVENTION

Field of the invention

This invention relates to current limiting devices and to automatic current limiting circuit breakers employing the same. More specifically, the invention relates to current limiting devices of the type employing vaporizable conductive material to achieve an extremely low "regulated" or sustained current value which may be zero or near zero, and to new and improved current limiting circuit breakers employing such current limiting devices in conjunction with a thyristor such as a silicon-controlled rectifier.

Description of the prior art

U.S. Patent No. 3,117,203, issued Jan. 7, 1964, entitled "Circuit Protective Devices and Circuits," R. L. Hurtle, inventor, discloses a "regulating" current-limiting device which is capable of limiting the magnitude of a short circuit current to a low "regulated" or sustained value, in the neighborhood of 10% of rated current, without itself interrupting the current. The regulating current limiter employs a body of substantially inelastic insulating material capable of withstanding extremely high pressures and temperatures and having at least one capillary formed therein filled with a vaporizable conducting material. The design is such that the conductor-filled capillary conducts current within the design rating with only small losses; however, upon the occurrence of an overcurrent, the conductor in the capillaries is vaporized. Conductor vaporization within the capillaries introduces extremely high losses and voltage gradients into the device that serve to limit and/or reduce the current through the device to a predesigned regulated low value that is ordinarily about 10% of rated current. The speed of response of the device to an overcurrent condition (i.e. the time required to vaporize the capillary conductors) depends upon the design of the device and the overcurrent magnitude. The time required to vaporize the capillary conductors may range from seconds for certain designs experiencing low overcurrents to microseconds for other designs subjected to short circuit conditions (i.e. large overcurrents).

It should be noted that the regulating current-limiting devices of the above-described type heretofore known only regulate the current to some predetermined, relatively low value normally about 10% of the device rated value, and rely upon an associated current interrupting means such as a contactor switch or reclosable circuit breaker to effectively interrupt the current. Such an arrangement is described in the above-referenced patent but requires the use of a relay-actuated mechanical-type interrupter employing physically separable contacts. Such combined limiter-mechanical interrupters are satisfactory for many circuit applications; however, they do possess a finite response time which for certain kinds of circuits, is too slow.

A thyristor is a power semiconductor device having characteristics similar to the gas thyratron in that once it is triggered into conduction, for example, by the application of a turn-on signal potential to a control gate electrode, it will continue to conduct even though the turn-on signal potential is removed. One of the best-known thyristors is the silicon-controlled rectifier (hereinafter referred to as an SCR), the characteristics of which are fully described in the SCR Manual, third edition, published by the General Electric Company—Semiconductor Products Department, located in Syracuse, N.Y. There are many other known types of thyristors which can be either two terminal, three terminal, four terminal, etc. devices, and can be either unidirectional or bidirectional conducting. For a further description of such thyristor devices, reference is made to the textbook entitled Semiconductor Controlled Rectifiers by F.E. Gentry, F. W. Gutzwiler, Nick Holonyak, Jr., and E. E. Von Zastrow, published by Prentice-Hall Inc. of Englewood Cliffs, N.J., 1964. A characteristic common to substantially all known thyristors, and to the SCR in particular, is the requirement that the current flowing through the device must be reduced below a known holding value (generally in the order of a few milliamperes) before the device will stop conducting, and return to its non-conducting, current blocking condition.

It is a primary object of the present invention to provide a new and improved current limiter of the vaporizable conductor type capable of reducing current flow through the device to zero or to an extremely low regulated value (on the order of a few milliamperes) which is below the normal holding current for thyristor devices, and while supplied from conventional power sources. The new current-limiters provided by the invention will be referred to as "quenching" current limiters, which term will be more fully defined hereinafter.

Another object of the invention is the provision of new and improved current limiting direct current static circuit breakers employing the new "quenching" current limiters of the invention in conjunction with solid-state power semiconductor thyristors to provide new current limiting direct current circuit breakers having improved operating characteristics.

A still further object of the invention is the provision of new and improved alternating current static circuit breakers employing either quenching current limiters or regulating current limiters connected in circuit relationship with solid-state power semiconductor thyristors.

SUMMARY OF THE INVENTION

In practicing the invention, new "quenching" current limiter devices are made available which are comprised of a main electrical insulating member having at least one capillary formed therein. Electrically conductive, physically inelastic terminal and backing means are secured on opposite sides of the main insulating member with the capillary extending through the main insulating member to contact both of the terminal and backing means. One of the terminal and backing means has a chamber formed therein which communicates with the capillary. A distendable surface encloses the chamber thus formed, and an electrically conductive vaporizable material normally fills the capillary and the chamber with the surface in the non-distended position. To complete the new quenching current limiter device, means are provided for establishing electrical contact to each of the terminal and backing means whereby the current limiter can be connected in electric-circuit relationship with a source of electric current.

By proper design measures, it is also possible to provide a quenching current limiter by appropriately designing a regulating current limiter of the temporarily vaporizable conductor type so that it can be operated in a quenching mode.

The invention is further characterized by the provision of a new and improved fast response current limiting circuit breaker which includes, in combination, a novel quenching current limiter of the temporarily vaporizable conductor type, thryristor means having its load terminals connected in series circuit relationship with the quenching current limiter and an electric load, across a source of electric current.

In preferred embodiments of the invention, the thyristor means is a gate controlled thyristor such as a silicon controlled rectifier and the current limiting circuit breaker further comprises turn-on circuit means operatively connected to the control gate of the gate controlled thyristor means and turn-off circuit means operatively connected in circuit relationship with the thyristor means for turning off the thyristor means manually at the option of an operator of the circuit. It is also anticipated that alternating current circuit breakers can be provided according to the invention which employ either regulating current limiters or quenching current limiters in conjunction with bidirectioal conducting thyristor means.

Other objects, features, and many of the attendant advantages of this invention will be appreciated more readily as the same becomes better understood by reference to the following detailed description, when considered in connection with the accompanying drawings, wherein like parts in each of the several figures are identified by the same reference character and wherein:

DESCRIPTION OF THE DRAWINGS

FIGURE 1 is a longitudinal, sectional view of one form of a new and improved quenching current-limiter device of the vaporizable conductor type constructed in accordance with the invention;

FIGURE 1A is a longitudinal view of the current limiter of FIGURE 1, with the end terminal members partially broken away;

FIGURE 2 is a longitudinal, sectional view of a modified form of the quenching current-limiting device shown in FIGURE 1;

FIGURE 3 is a longitudinal sectional view of still a different modification of the quenching current limiter construction shown in FIGURE 1;

FIGURE 4 is a longitudinal sectional view of a second form of new and improved quenching current-limiter device constructed in accordance with the invention and which operates somewhat differently than the quenching current limiters shown in FIGURES 1–3 in the manner of a regulating current limiter, but has been appropriately designed to operate in a quenching mode;

FIGURE 5 is an idealized current-versus-time operating characteristic curve of a static circuit breaker employing the quenching current-limiting device of FIGURE 1 connected in series with a thyristor device, and illustrates the manner in which a regulated low value "quench" or "off" time can be obtained to turn off the thyristor with the quenching current limiter;

FIGURE 6 is a schematic circuit diagram of a new and improved direct current static, current-limiting circuit-breaker employing a quenching current limiting device in conjunction with a silicon-controlled rectifier;

FIGURE 7 is a schematic circuit diagram of a modified form of the current-limiting circuit breaker shown in FIGURE 8;

FIGURE 8 is still another form of a direct current, static, current limiting circuit breaker constructed in accordance with the invention;

FIGURE 9 is a schematic circuit diagram of a modified form of the current-limiting circuit breaker shown in FIGURE 8;

FIGURE 10 is a schematic circuit diagram of a new and improved static current limiting circuit breaker constructed in accordance with the invention for use with alternating current circuits;

FIGURE 11 illustrates a group of operating characteristic curves for the circuit shown in FIGURE 10; and FIGURE 12 is a schematic circuit diagram of an alternating current circuit breaker according to the invention which used a triac bidirectional conducting thyristor.

DESCRIPTION OF THE PREFERRED EMBODIMENTS

The regulating current limiters disclosed in U.S. Patent No. 3,117,203 were primarily designed to reduce either an overload current or a fault current to a regulated current value which is approximately 10% of rated current and thereafter to hold the current at the lower regulated level. This is done without forcing the current through the regulating current limiter to zero. However, the regulated current value is selected such that a back-up current interrupting device can act and permanently interrupt this circuit with the back-up interrupter device being required to interrupt only the lower regulated current value.

The quenching current limiters comprising the present invention are designed to operate in a quenching mode of operation wherein a "quench" or "off" period is provided to the quench. While in preferred embodiments of the invention the quench provided is complete, that is to say there is no current flowing through the limiter, for the purposes of the present disclosure the quench is also intended to include those very small current values (in the milliampere region) wherein only a very small current analogous to a post-arc current flow through an interrupter or circuit breaker, is allowed to flow. When one considers that the current limiters in question are designed for use in 200 amp, 1,000 amp, etc. power circuits, the reduction of current flow through the limiters to the milliampere region in effect constitutes an effective "quench" of current flow through the device. It will be appreciated, therefore, that there are two primary requirements of a quenching current limiter. The first requirement is that the quenching current limiter must be capable of attaining a quench as defined above. Secondly, the quench attained by the quenching current limiter must endure for a small but nevertheless sufficient period of time, about 50 microseconds, in order to allow an associated thyristor device sufficient time to recover itse nonconducting, current blocking condition.

A quench is attained with a quenching current limiter when the minimum dynamic voltage of the quenching current limiter exceeds the source voltage. The term minimum dynamic voltage is employed because the quenching current limiter, when fired, has a voltage characteristic which changes in direct or positive relation to current, whereby its voltage decreases with a decrease in current, and vice versa. It follows from the above definition of a quench that the voltage of the quenching current limiter must be maintained at a value at least equal to the source voltage during the quenching interval.

There are three principal design variables by which the voltage across a current limiter of the vaporizable conductor type may be controlled. These design variables were discussed more fully in U.S. Patent No. 3,117,203 in connection with the regulating current limiter therein described; however, they are equally applicable to a quenching current limiter. The three principal design variables of interest are (1) the capillary diameter and number of parallel capillaries provided in the device (paralleling principle) (2) the length of the capillaries and (3) the pressure of the vapor in the capillaries during the operating interval of the device. The voltage across the quenching current limiter will be higher with an increase in the number of capillaries provided, an increase in the length of the capillary and an increase in the pressure of the vapor within the capillaries during the quenching interval.

A quench attained with a quenching current limiter will endure in either of two ways: (1) if the vapor produced in the capillaries by the vaporizable conductor is superheated at the initiation of the quench (i.e., heated substantially above the vaporization temperature, some period of time must elapse for the superheat to dissipate sufficiently to allow coalescence of the vaporizable conductor. This is to say, that as long as the vapor condition exists, the current limiter is in its insulating or quenching condition, so that coalescence or reforming of the conductor into a conducting path is prevented. Since such coalescence or reforming of the conductor in at least one capillary is necessary for reconduction, the quench will continue until such coalescence or reforming occurs. Superheating of the vapor in the capillaries occurs when the power input to the quenching current limiter exceeds the power output. The degree of super heat of the vapor (which is directly related to the quench duration) therefore depends upon the difference between the power input and the power output and its duration. FIGURE 4 of the drawings illustrates a quenching current limiter operating on this principle.

The second manner in which a quench can be made to endure in a quenching current limiter of the vaporizable conductor type occurs if: (2) the vaporizable conductor at one or both ends of the capillaries becomes physically displaced and the vapor density at these points becomes lower. At some lower level of vapor density there will be too few molecules to provide a continuous conductive filament upon coalescence or reforming of the vaporizable conductor. Hence, no conductive path will be immediately reformed thereby providing an extended quench. FIGURES 1 through 3 of the drawings disclosed quenching current limiter designs which obtain an extended quench by relying upon a very low density vapor or plasma in the capillaries in the above-mentioned manner.

FIGURE 1 of the drawings illustrates a new and improved quenching current limiter constructed in accordance with the principles discussed in (2) above. The quenching current limiter shown in FIGURE 1 comprises a main, cylindrically shaped electrical insulating member having a central portion 11 and two end portions 18 and 19 with at least one capillary 12 formed in the central portion 11. The main insulating member 11, 18 and 19 preferably comprises a dense, non-porous, ceramic material formed from a very dense, polycrystalline ceramic preferably produced from fine grain, high purity aluminum oxide powders which are pressed at room temperature and fired at sintering temperatures which are higher than usual for ceramics. One material suitable for this purpose is a product manufactured and sold by the General Electric Company under the trademark "Lucalox." This material, when fired in the above manner, has an extremely high physical strength and presents exceptionally high resistance to high temperatures in addition to being translucent. Because of these characteristics, the insulating member 11, 18 and 19 is capable of withstanding extremely high pressure and high temperature. Other materials which also exhibit these characteristics could be employed to fabricate the member 11, 18 and 19; however, the above-described material is preferred for the reasons stated.

In fabricating the main insulating member the capillary aperture 12 is caused to open onto one side or surface of a cylindrically shaped opening 19' which extends through the diameter of the entire body between the central portion 11 and the end portion 19. At its remaining end capillary 12 extends into a channel portion 13 which similarly opens onto a side or surface of a second cylindrically shaped opening 18' that extends through the diameter of the entire body between the central portion 11 and the end portion 18.

Electrically conductive, physically inelastic, terminal means 14 and 15 are secured in the cylindrically shaped openings 18' and 19' respectively formed on opposite sides of the central portion 11 of the main insulating member. These terminal means comprise inelastic, electrically conducting plugs 14 and 15 which are pressed into the cylindrically shaped openings 18', 19' in the end portions of the main insulating member. One of the terminal members 15 comprises aluminum and engages one end of the capillary 12. The remaining terminal member 14 is made up of three sections 14A, 14B, and 14C. The sections 14A and 14B are made up of aluminum. The central section 14C is made up of steel. The steel section 14C has a pressure-bleeding orifice 17 formed therein which is aligned with and communicates with the enlarged channel portion 13 of the capillary 12 formed in the central portion 11 of the main insulating member.

The end portion 18 of the main insulating member has a channel 21 formed therethrough which communicates with the aperture 12 through the pressure bleeding orifice 17 in terminal member 14, and the enlarged channel portion 13. The channel 21 opens into and, at least in part, helps to define a chamber 22 that similarly communicates through the channel 21, pressure-bleeding orifice 17 and enlarged channel 13 with the capillary 12. The chamber 22 is defined by an annular-shaped steel ring 23 and an O-ring seal 24 secured in place over the end of the end insulating member 18.

In order to hold the structure thus-far described together in assembled relation, a set of spaced-apart, electrically conductive contact members 25 and 26 are secured over the main insulating member, terminals members 14 and 15, steel ring 23 and O-ring seal 24 in a manner such that the two contact members 25 and 26 are electrically insulated one from the other. The contact members 25 and 26 preferably are relatively thick-walled, cup-shaped, electrically conductive members wherein the bottom portion 27 of the cup-shaped terminal member 25 is formed sufficiently thin to comprise a distendable spring surface. Preferably, the terminal members 25 and 26 are formed from steel, press-fit over the assembly of elements thus far recited, and secured thereto by brazing, etc. In the case of the main insulating member it is bonded to the contact members 25 and 26 by a glass or glass like frit such as Allied Porcenell #1091 P.M. or Corning Pyroceram #95.

The new and improved quenching current limiter device shown in FIGURE 1 is completed by an electrically conductive vaporizable material normally filling the space defined by the chamber 22, channel portion 21, pressure-bleeding orifice 17, enlarged channel portion 13, and capillary 12 with the distendable surface portion in the nondistended position. This electrically conductive, vaporizable material preferably comprises mercury, but, if desired, can comprise an eutectic mixture of sodium and potassium, or any other suitable conductive material which preferably is liquid at ordinary room temperatures. If desired, solid conductors could be employed; however, liquid conductors are preferred in order to optimize the time response of the current limiting device to an overcurrent condition. If desired, terminal leads shown at 30 may be welded or otherwise secured to the terminal members 25 and 26 in order that the current limiter can be connected in electric circuit relationship with a source of energizing electric current. The manner in which the liquid conductor is enclosed within chamber 22, etc., and the manner in which the cup-shaped steel terminal members 25 and 26 are secured over the main insulating member as well as the steel ring 23 and O-ring seal 24 is described more fully in the above-referenced Patent No. 3,117,203, and such details of construction will not be further elaborated in this description.

The manner of operation of the increased quench current-limiting device shown in FIGURE 1 will be described more fully hereinafter in connection with FIGURE 5. First, however, a brief description of the physical process whereby current limiting takes place within the structure shown in FIGURE 1, is deemed desirable. Under normal operating conditions, i.e., when initially placed in service, the distendable surface 27 is in the non-distended position, and the liquid conductor extends throughout the chamber 22, channel 21, pressure-bleeding orifice 17, enlarged channel portion 13, and capillary 12 to provide an electrically conductive path between the terminal members 14 and 15 which physically engage and are electrically connected to the contact members 25 and 26. Electric current flow is established through suitable contacts 30 welded to the contact members 25 and 26. It is noted that the main insulating member electrically isolates the contact members 25 and 26 so that current flow must take place through the aluminum terminal members 14, 15 and the liquid vaporizable conductor contained in the enlarged channel portion 13 and capillary 12.

The capillary 12 is designed such that for normal currents, no great heating of the liquid conductor in the capillary takes place. However, upon the occurrence of an overcurrent, because of the restricted nature of the capillary 12, the liquid conductor in this portion becomes heated sufficiently to vaporize. Vaporization of the conductor in the capillary 12 introduces an extremely large loss in the conductive path between the terminal members 14 and 15 and results in the production of a very large voltage gradient across this path. The capillary 12 is designed so that its voltage approaches or exceeds the voltage of the source of energizing potential with which the limited is used so as to in effect drive the current through the capillary to zero or near zero value. The result is to almost instantaneously reduce the magnitude of the current flowing through the device to a predetermined regulated low value.

The design of the quenching current limiter shown in FIGURE 1 is such that the temperature and pressures within the capillary 12 and the enlarged channel portion 13, when vaporization occurs as described above, become sufficiently great to drive part of the liquid conductor through the pressure bleeding orifice 17. This causes the distendable spring steel plate surface 27 to be distended thereby enlarging the chamber 22. This has the effect of protracting the quench or current-zero period. More particularly, by this means current flow is reduced to zero or near zero for an interval of time greater than would otherwise be possible, and more importantly, for a period of time sufficient to allow an associated current interrupting thyristor device to permanently interrupt current flow. In other words, the quench period (i.e., the period when the current through the current limiter is at the regulated low value), is designed to be sufficiently long to allow an associated thyristor to recover its current blocking capability. The regulated low value of current flowing through the limiter during this period is zero or at least below the minimum holding current value for thyristors. Such a combined current-limiting-circuit breaker arrangement will be described hereinafter in conjunction with FIGURES 6 through 14 of the drawings. Thereafter, the distendable spring sprface 27 will return the liquid conductor back through the pressure bleeding orifice 17 to re-establish the conductive path through channel 13 and capillary 12. This process requires a predeterminable amount of time. Design of the pressure bleeding orifice 17, therefore may be utilized to determine the length of the quench period.

FIGURE 5 of the drawings illustrates an idealized current-versus-time operating characteristics curve of the quenching current limiter. In the characteristic curve of FIGURE 5, it will be seen that the fault or overcurrent will rise to a peak value shown at 46 sufficient to initiate current-limiting action by the current-limiting device. In this process, vaporization of the conductive material in the capillary takes place and current through the device is reduced over the portion of the curve shown at 47. As previously described, the vapor developes pressure nad forces the liquid conductor out through pressure bleeding orifice 17 into chamber 22 distending distendable surface 27. The limiter thereupon assumes its "quenched" or "off" condition. The device will then remain in the "off" condition for the period of time $t_1$. The "off" time $t_1$ may be adjusted by appropriate design of the limiter to provide adequate time to allow an asociated thyristor device to be turned off, thereby causing the circuit to assume a stable off condition. Circuit arrangements of this type will be described hereinafter in connection with the circuit breakers shown in FIGURES 6 through 12 of the drawings.

The off period $t_1$ allows the superheated vaporized conductor in the chamber 22 to cool so that the vaporized conductor reverts to its liquid phase. Upon this occurrence, the distendable spring surface 27 will return to its normal position, and in doing so forces the cooled liquid conductor back through the pressure-bleeding orifice 17 to again fill capillary 12. This re-establishes the conductive pathway within the current limiter and allows it to again conduct current. Assuming that the circuit has not been permanently interrupted and that the overcurrent condition still exists, then output of the current limiter would be a series of pulses as shown in dotted outline form in FIGURE 5.

FIGURE 2 of the drawings illustrates a modified form of the quenching current limiter shown in FIGURE 1. In the device shown in FIGURE 2, the terminal member 15 is provided with additional support in the form of a transverse pin 28 extending at right angles to the terminal member 15. Terminal member 15 has an integral portion 15' extruded into an opening 29 in the member 19. The extruded portion 15' of the member 15 butts against the transverse pin 28. This structural arrangement provides additional support to the terminal member 15 in order that the same can successfully withstand the extremely high pressure and temperature built up as a consequence of superheating of the liquid conductor contained in the capillary 12 during overcurrent conditions. Except for this difference, the limiter of FIGURE 2 includes the same parts and functions in the same manner as the device shown in FIGURE 1.

FIGURE 3 of the drawings illustrates still a different modification of the quenching current limiter construction employing a distendable surface. In the modification of the invention shown in FIGURE 3 a main, cylindrically-shaped, inelastic, electric insulating ceramic member is shown at 11 having a capillary pasageway 12 formed therein which communicates between two enlarged channel portions 12a and 12b. A pair of inelastic, electrically conducting terminal members 14 and 15 are disposed on opposite ends of the main insulating member 11, and are exposed to the ends of the capillary 12 through the enlarged channel portions 12a and 12b, respectively.

One of the terminal members 14 is in the form of an electrically conductive, aluminum plug that is pressed into the main insulating member 11 in a direction parallel to its longitudinal axis. A pressure bleeding orifice 17 is formed in the aluminum plug 14 in a manner so as to communicate with the capillary 12 through the enlarged channel portion 12a. The remaining terminal member 15 is in the form of an electrically conductive, aluminum plug having an internally threaded opening 15a formed therein. The threaded opening 15a formed in the aluminum plug 15 is axially aligned with the longitudinal axis of the main insulating member 11, and has a small channel 15b which communicates between the threaded opening 15a and the enlarged channel portion 12b of the capillary 12. A threaded steel screw 15b having a fillister head, which forms one of the contact members for the device is threadably secured in the threaded opening 15a of terminal member 15.

The main electrical insulating member 11 is a relatively thick walled, high density ceramic such as "Lucalox" and is contained within a relatively thick walled, high strength, annular steel jacket 10. The main insulating member 11 is cylindrically shaped and has a slightly tapered external surface which cooperates with a similar internal taper on the steel jacket 10. A cup-shaped, contact member 25 is telescoped over the end of the main insulating member 11 and surrounding steel jacket 10 in which the terminal member 17 is secured. The cup-shaped, contact member 25 has a bottom portion 27 which comprises a spring steel distendable surface. The distendable surface 27 of cup-shaped contact member 25 is spaced away from the end of the cylindrically-shaped main insulating member 11 and surrounding steel jacket 10 by an annular steel ring 23 and an O-ring seal 24 so as to define a chamber 22. The chamber 22 communicates through the pressure bleeding orifice 17 in terminal member 14 and enlarged channel portion 12a with the capillary passageway 12.

The quenching current limiter shown in FIGURE 3 is completed by a vaporizable conductive material (not shown) which is enclosed within the space comprised by chamber 22, pressure bleeding orifice 17, the capillary passageway 12 including the enlarged channel portions 12a and 12b, the channel 15b in the end of the terminal member 15 and that part of the threaded opening 15a which is not filled by the threaded screw 15c. In assembling the current limiter, the vaporizable conductor material which may comprise mercury, is allowed to fill the spaces enumerated above and then the threaded steel screw 15c is threaded into place in the threaded opening 15a in terminal member 15. The screw 15c is then screwed down hard until it engages an O-ring seal shown at 15d to completely seal the opening 15a and place the enclosed mercury under pressure. In operation the species of the invention shown in FIGURE 3 functions in the same manner as the current limiter shown in FIGURES 1 and 2, and hence a further detailed description of its manner of operation is believed unnecessary.

FIGURE 4 of the drawings illustrates a different embodiment of a quenching current limiter which operates in accordance with the principles identified as (1) in the preceding description wherein the vapor of the vaporizable conductor is superheated sufficiently to provide a current quench or "off" period. In this embodiment of the invention, the vaporizable conductor is superheated to a greater degree than is the case with the regulating current limiter so that some time must elapse for the superheat to dissipate sufficiently to allow the vaporizable conductor to again coalesce or reform into a conductive path. For so long as the vapor of the vaporizable conductor is superheated, it insulates against conduction through the current limiter. The degree or amount of superheat of the vaporizable conductor plasma, to which the obtained quench or "off" duration is directly related, is in proportion to the ratio of the power input to the power output. By increasing this ratio, over that obtained with the regulating current limiter, a quench or "off" interval can be obtained, and its duration extended.

FIGURE 4 of the drawings illustrates a current limiting device construction which is capable of operating in the quenching mode wherein it attains an extended quench or "off" period. The current limiter device shown in FIGURE 4 is comprised by a main insulating member 11 which is generally cylindrically shaped and fabricated from a dense, high quality, high strength, fired ceramic such as "Lucalox." The main insulating member 11 has a capillary passageway 12 formed therein along its longitudinal axis which terminates into enlarged channel portions 12a and 12b. Electrically conductive, phsyically inelastic terminal means 14 and 15 are secured on opposite ends of the main insulating member 11. Each of the terminal means 14 and 15 comprises an electrically conductive aluminum plug member having internally threaded openings 14a and 15a which are in longitudinal alignment with the longitudinal axis of the main insulating member 11. Each of the threaded internal openings 14a and 15a communicate with the enlarged channel portions 12a and 12b through channels 14b and 15b, respectively. Externally threaded, conductive, high strength steel screws 14c and 15c which serve as contact terminals are threadably secured in the internally threaded openings in the terminal members 14 and 15, respectively.

An electrically conductive, vaporizable material, preferably mercury, normally fills the capillary passageway 12 the channel portions 12a and 12b, 14b and 15b and the portions of the internally threaded openings 14a and 15a which are not filled by the threaded screws 14c and 15c. In assembling the apparatus the mercury is poured into these spaces and then screws 14c and 15c screwed down against O-ring seals 14d and 15d, respectively so as to place the enclosed mercury under pressure. Suitable means for connecting the limiter in electrical circuit relationship with other electrical components may be welded or otherwise secured to the heads of the screws 14d, 15d or to the terminal plug members 14 and 15. In order for the quenching current limiter shown in FIGURE 4 to function properly at the high temperatures and pressures required for it to operate in a quenching mode, the generally cylindrically shaped main insulating member 11 is enclosed within a surrounding, high strength steel jacket 10 which has a slightly tapered internal surface of about two degrees cooperating with a similarly tapered surface on the main insulating member 11. The arrangement is such that the surrounding steel jacket 10 is electrically insulated from the terminal members 14 and 15.

In operation the quenching current limiter shown in FIGURE 4 of the drawings will function in much the same manner as previously known regulating current limiters such as that described in U.S. Patent No. 3,117,- 203; however, it is designed to achieve a current quench mode of operation. The quenching mode of operation can be attained with the structure shown in FIGURE 4 since it is capable of operating at much higher temperatures and pressures than previously known regulating current limiters. This is due in part to the high strength steel jacket 10 which is press fitted over the main insulating ceramic member 11 as well as appropriate design of the number and length of the capillary passages 12, and the pressure at which they are designed to operate. This construction allows the device to be operated at higher voltages on a per unit length basis, and thus allows an increase in the power input per unit volume of current limiter. Since the power output from a unit volume of the device is fairly well limited, the resultant increased differential provides an increase in the superheat, and hence the quench duration. By appropriate variation of the three main design parameters or variables of the quenching current limiter, the capillaries will provide a much higher minimum dynamic voltage across the device. Thus it will be appreciated that the resultant vapor or plasma in the capillary will be superheated to a greater extent than was the case with the prior art regulating current limiters. Since the amount of superheat to which the quench duration is directly related depends upon the difference of the power input to the power output, it will be appreciated that with the current limiting device shown in FIGURE 4 a quenching mode of operation becomes possible.

FIGURE 6 of the drawings is a schematic diagram of a circuit including a fast response current-limiting static circuit breaker constructed in accordance with the invention. In the current-limiting circuit breaker shown in FIGURE 6 a quenching current limiter device shown at 30 is connected in series-circuit relationship with a thyristor 60 and a load 61 across a source of direct current electric potential shown at 62. The quenching current limiting device 30 may comprise any of the quenching current limiters shown in FIGURES 1-4. For the purposes of the present disclosure, the thyristor 60 is defined as preferably comprising a gate controlled, power, semiconductor thyristor device such as the silicon controlled rectifier (SCR) having characteristics similar to those of the gas thyratron such that once it it triggered into conduction, for example by the application of a turn-on signal potential to the control gate of the device, the will continue to conduct even though the turn-on signal potential is removed. Conduction through the device is stopped, and the device is returned to its nonconducting, current-blocking condition only by reducing current flow through the device below a known minimum holding value whereby the device will revert to its nonconducting, current blocking condition.

The particular thyristor device shown in FIGURE 6 comprises a conventional SCR having what is conveniently termed its "cathode" electrode connected through the quenching current limiter device 30 to the negative terminal of the source of potential 62, and having what is conveniently termed its "anode" connected through the load 61 to the positive terminal of source 62. The SCR, has a control electrode, shown at 63, which is connected through a conventional on-off switch 64 and a limiting resistor 65 to the positive terminal of the source of potential 62. The anode electrode of SCR 60 is connected through a second on-off switch 66 and a second series-connected limiting resistor 67 to the positive terminal of source 62 so that, in effect, the switch 66 and limiting resistor 67 are connected in parallel circuit relationship with the load 61.

In operation, the on switch 64 and the off switch 66 are normally open switches. To place the circuit in operation, switch 64 is depressed so as to apply a positive gating-on potential to the control gate 63 of SCR 60. This causes SCR 60 to be rendered conductive and to supply load current through the load 61 and through the quenching current-limiter device 30. For so long as no over current condition exists, the circuit will continue to operate. However, in the event of an overcurrent, the quenching current limiter device 30, upon vaporization of the conductor filled capillaries, will quickly reduce the value of the overcurrent to zero or a predetermined regulated low value that is near zero. The quenching current limiter device 30 is designed so that the near zero value is below the holding current value of the SCR 60, and such that the period of time indicated at $t_1$ in FIGURE 5 is sufficient to allow the SCR 60 to revert to its blocking, nonconducting condition. Thus, it will be appreciated that after the interval $t_1$, the SCR 60 being in its blocking, nonconducting condition, causes the circuit to remain in a stable "off" condition.

In the event that an operator desires to manually turn the circiut off, and thus discontinue normal operation of the circuit, the normally open "off" switch 66 is depressed so that a current path around load 61 is provided through the current-limiting resistor 67. The current-limiting resistor 67 is designed such that momentary closing of the "off" switch 66 will cause an overcurrent to be drawn through the quench current-limiter device 30, thereby producing a turn-off action similar to that obtained during automatic turn-off of the circuit upon the occurrence of an overcurrent as described above.

FIGURE 7 of the drawings is a schematic circuit diagram of an embodiment of the current limiter thyristor current limiting circuit breaker, similar in many respects to the circuit of FIGURE 6, but differs therefrom in the manner of manual turn-off. In the circuit of FIGURE 7, elements which correspond to like elements of the circuit shown in FIGURE 6 have been given the same reference numeral, and operate similarly. There are certain disadvantages to the circuit shown in FIGURE 6, however, and these are that the "off" switch contact must establish current flow through the switch under overload conditions. After a certain number of turn-off operations under such condtions the switch contacts will erode. Hence, the "off" switch must be designed to have "power" contacts. Additionally, every manual "off" requires that the quenching current-limiter device 30 be fired, and this tends to shorten the effective operating life the device. In order to overcome these objections, the circuit arrangement shown in FIGURE 7 is provided.

In the FIGURE 7 circuit, manual turn-off is accomplished with an additional SCR 70 in series circuit relationship with a commutating capacitor 71, the series circuit thus comprised being connected across the series circuit comprised by first SCR 60 and the quenching current limiter device 30. The second SCR 70 has its control gate 73 connected through the manual on-off switch 66 and a current-limiting resistor 74 to the positive terminal of the source 62. The juncture of the second SCR 70 with the commutating capacitor 71 is connected through a charging network comprise d by a limiting resistor 75 and a blocking diode 76 to the positive terminal of the power source 62. By this arrangement, the plate of commutating capacitor 71 that is connected to the anode of second SCR 70 will be charged positively through the blocking diode 76 in the manner indicated by the polarity markers plus minus (+ and −).

In operation during normal conditions, the circuit of FIGURE 7 is turned on similarly to the FIGURE 6 circuit and supplies load current to the load 61 through the quenching current limiter device 30 and first SCR 60. Upon the occurrence of an undesired overcurrent condition in the circuit, the circuit will automatically turn off as described above with relation to FIGURE 6. However, if it is desired to manually turn the circuit off, the switch 60 is depressed to provide a gating-on potential to the control gate 73 of second SCR 70. Upon this occurrence, second SCR 70 is rendered conductive and operates to apply the reverse polarity potential appearing across the commutating capacitor 71 back through the quenching current limiter device 30 (which exhibits a very small impedance only under normal or less than normal current flow) across the load terminals of the first SCR 60. This reverse polarity potential will cause the current through the first SCR 60 to be reduced below its holding value allowing it to turn off automatically. Thus, it will be appreciated that a stable "off" of the circuit of FIGURE 7 is obtained without requiring closure of normally open contacts on a circuit that establishes immediately an overcurrent condition, and further achieves the stable "off" without requiring firing of the quenching current limiter device 30.

FIGURE 8 of the drawings illustrates a modification of the circuit shown in FIGURE 7 wherein a power transistor shown at 77 is substituted in place of the series-connected second SCR 70 and commutating capacitor 71. The power transistor 77 has its emitter-collector connected in parallel-circuit relationship with the series-connected quenching current-limiter device 30 and first SCR 60. The base of the power transistor 77 is connected back through the normally open manual off switch 66 and a current-limiting resistor 76 to the positive terminal of the power source 62. In operation, the circuit of FIGURE 8 under normal current conditions functions in the same manner as the circuits of FIGURES 6 and 7 to achieve automatic turn-off upon the occurrence of an undesired overcurrent condition. When it is desired to manually turn off the circuit of FIGURE 8 the normally open off switch 66 is depressed to provide an enabling potential to the base of the power transistor 77. Upon this occurrence, the power transistor 77 diverts or shunts away sufficient current from the SCR 60 to cause its current to be reduced below its minimum holding value, thereby allowing SCR 60 to assume its non-conducting, current-blocking condition. Thereafter, upon releasing the off switch 66 so that the power transistor 77 turns off, the circuit will assume a stable "off" condition.

FIGURE 9 illustrates an embodiment of the invention somewhat similar to that shown in FIGURE 8 in that it employs a power transistor 77 to achieve manual turn-off of the circuit; however, it differs in the manner of automatic turn-off upon the occurrence of an undesired overcurrent condition. Referring to FIGURE 5 of the drawings, it should be noted that in all of the circuits shown in FIGURES 8 through 10, "turn-off" of the SCR 60 does not commence until inception of the period $t_1$ shown as starting at point 48. Consequently, the circuit continues to conduct current, albeit a limited current, throughout the interval 47 while the increased quench current-limiter device 30 is attaining a superheat condition. This requirement imposes somewhat of a burden on the quenching current-limiter device 30, and to ease this burden, the circuit of FIGURE 9 is provided.

In the circuit of FIGURE 9, the current-limiter device 30 may be either the quenching type or the regulating type. The limiter 30 has a gating transformer comprising a primary winding 81 connected across it. The secondary winding 82 of the gating transformer is connected to a charging network comprising a resistor 83 and a capacitor 84 connected in series-circuit loop relationship with the secondary winding 82. The juncture of the resistor 83 with capacitor 84 is connected through a conductor 85 to the cathode electrode of SCR 60 and the juncture of the secondary winding 82 with capacitor 84 is connected through a limiting resistor 86 to the base of the power transistor 77. By reason of this arrangement, the power transistor 77 can be operated to turn off the SCR 60 either by the application of a turn-off potential to its base by the manual off switch or by the application of a turn-off potential through the limiting resistor 86 from the charging network comprised by 82, 83, and 84.

In operation, the circuit of FIGURE 9 functions similar to the FIGURE 8 circuit during turn-on, normal operation, and manual turn-off. However, upon the occurrence of an undesired overcurrent condition, at the inception of the conductor vaporization period shown at 46 in FIGURE 5, the increased voltage across quenching current-limiter device 30 will produce a current flow in primary winding 81. This current flow in turn induces a current flow through the secondary winding 82 to the capacitor 84 to cause it to build up a charge sufficient to provide an enabling turn-on potential to the base of the power transistor 77. Thus, it will be appreciated that at the inception of the current-limiting condition, power transistor 77 will be turned on. This diverts sufficient current from the SCR 60 to bring current flow through the SCR below its holding level.

In the case where a quenching current limiter is used, the current is thereafter driven by zero by the quenching current limiter as previously described. It will remain at zero even though the limiter later coalesces and reestablishes its conducting condition, since the SCR is in its "off" condition and since there is no "on" bias on the power transistor 77. In this case it will be observed that the SCR is turned off at the start of the arcing period in the quenching current-limiter 30, and that its "off" time is therefore the sum of the current-limiter arcing time plus the current-limiter "off" time as shown at $t_2$ in FIGURE 5, instead of only the "off" time as shown at $t_1$. As a consequence, the current-limiter "off" time may be decreased which permits a decrease in the arcing time (super-heat time) which in turn means less strain on the quenching current-limiter device 30 for each overcurrent interruption which it is called upon to produce. In the case where a regulating current limiter is used at 30 in the circuit of FIGURE 9 instead of a quenching current limiter, the following action takes place. Upon the occurrence of an overcurrent condition, the limiter 30 fires, diverting current through the transformer primary 81 and inducing a secondary voltage and consequent current charging the capacitor 84 and applying "on" bias to the power transistor as previously described, turning off the SCR 60. The current in the circuit is then reduced to a low level and kept substantially constant at this reduced level, as described in detail in my aforesaid Patent 3,117,203. When the current is held to this steady-state condition, the voltage on the transformer secondary 82 drops to zero since there is no changing flux cutting its turns. The "on" bias on the power transistor therefore disappears, and the transistor becomes non-conducting, reducing the circuit current to zero where it remains until the "on" switch is again closed.

FIGURE 10 of the drawings illustrates an alternating current version of a new and improved current-limiting static circuit breaker constructed in accordance with the invention. The alternating current, current limiting circuit breaker arrangement shown in FIGURE 10 comprises a pair of current limiter devices 30 and 30' of the vaporizable conductor type which may be regulating current limiters or quenching current limiters. The devices 30 and 30' are connected in series-circuit relationship with a pair of reverse polarity, parallel connected SCR's 60 and 60', respectively, and with a load 61 across a source of alternating current potential shown at 90. The reverse polarity, parallel-connected SCR's 60 and 60' each have their control gates 63 and 63', respectively, connected to turn-on gating circuits 91 and 91', respectively, which in turn are connected through relay-actuated contacts 92 and 92' across the source of alternating current potential 90. The solenoid actuating winding 93 of the relay-operated contacts 92 and 92', is connected in series with the load 61, the reverse polarity, parallel connected SCR's 60 and 60' and their respective associated current limiters 30 and 30'.

Since the turn-on gating circuits 91 and 91' are similar in construction and operation, with the exception that they operate on reverse polarities of the supply alternating current potential, only the turn-on gating circuit 91 will be described in detail. The turn-on gating circuit 91 comprises a rectifying diode 94 and a smoothing capacitor 95 connected in series-circuit relationship through the relay-actuated contacts 92 and 92' across the source of alternating current 90. A resistor 96 is connected in parallel with capacitor 95 for controlling the charge thereon, and a limiting resistor 97 is connected between the terminal of capacitor 95 receiving a positive charge, and the control gate 63 of SCR 60. As a consequence of this arrangement, it will be appreciated that when the terminal A of source 90 is negative with respect to the terminal B, current will flow through the rectifying diode 94 and charge capacitor 95 with the polarities indicated. During the next succeeding half-cycle when the polarities are reversed so that terminal A is positive with respect to terminal B, the presence of this positive turn-on potential on the control gate 63 at the time that the anode of SCR 60 goes positive, allows SCR 60 to be rendered conductive and to conduct load current through load 61 and current-limiter device 30. During the reverse half-cycle, the reverse phenomenon occurs through SCR 60' to thereby supply alternating current to load 61 through the current-limiting device 30'. It should be noted that by reason of the alternating current nature of the supply potential, the SCR's 60 and 60' automatically will be turned off at the end of each half-cycle of the supply alternating current due to the fact that the holding current through each SCR is reduced below the minimum holding value during the current zero that naturally occurs at the end of each half cycle.

The operation of the circuit shown in FIGURE 10 will be described in conjunction with the characteristic curve shown in FIGURE 11. If it is assumed that the relay contacts 92 and 92' are closed at point 98 shown in FIGURE 11, and overcurrent occurs at point 99, then the characteristics of the circuit will be as shown. It is noted that during the alternate half-cycle, the potential at the terminals A and B identified by the terms $E_A$ and $E_B$ will be alternately positive. During the half-cycle when $E_{A'}$ is positive, current $i_1$ flows and during the second half cycle when $E_B$ is positive, current $i_2$ flows. The circuit thus operates to supply alternating load current through the load 61 under normal operating conditions until it is desired to interrupt the circuit which can be readily achieved by opening the relay.

Upon the occurrence of an overcurrent such as that indicated at 99, the load current shown at $i_1$ rises sharply to the point where it is limited by the current-limiter device 30. Thereafter during the arcing interval of the current-limiter device 30, the current $i_1$ will be limited down along the portion of the curve shown at 101 until it reaches a near zero value below the minimum holding current value of the SCR 60 shown at 102. Concurrently, with this operation, the winding 93 will sense the decrease in current and will start to drop out. The relay drop-out time shown at 103 is chosen to be less than a half-cycle of the alternating current supply so that the turn-on gating circuit means 91 and 91' are inactivated prior to the next succeeding half-cycle. With no turn-on gating potential applied to their control gates, the SCR's 60 and 60' will remain in a nonconducting, current-blocking condition so as to cause the circuit to assume a stable off condition. Manually operated means, not shown, is provided for reclosing contacts 92, 92'.

FIGURE 12 of the drawings illustrates still another form of alternating current, current limiting circuit breaker constructed in accordance with the invention. In the embodiment of the invention shown in FIGURE 12 a single current limiter 30 of the vaporizable conductor type is connected in series circuit relationship with a triac bidirectional conducting thyristor 111 and a load 61 across a pair of alternating current power supply terminals 90a and 90b. The triac 111 is in fact a bilateral semiconductor triode switch described more fully in chapter 3 of the above identified Semiconductor Controlled Rectifiers book by Gentry, Gutzwiler, Holonyak and Von Zastrow. In its operating characteristic the triac is similar in many respects to a pair of reverse polarity, parallel connected SCR's in that it is capable of conducting current in either one of two directions; however, conduction through the device is controlled from a single control gate electrode. For this reason the triac 111 has a single control gate electrode that is connected to a pair of control gate circuit means 91 and 91'. The control gate circuit means 91 operates to apply a turn-on gating potential to the control electrode of the triac 111 during one half alternation of the alternating current supply, and the turn on circuit 91' operates similarly during the remaining half cycle. For this reason the turn on circuit 91' is merely a reflection of the turn on circuit 91, and is constructed and operates similarly. Hence, only the turn on circuit 91 will be described in detail.

The turn on circuit 91 comprises a rectifying diode 94 connected in series circuit relationship with a smoothing network comprised by a filter capacitor 95 and a resistor 96 connected in parallel with the capacitor 95. The series circuit thus comprised is connected across the alternating current supply terminals 90A and 90B through a pair of normally closed contacts 92 and 92' of a magnetically operated contact switch having a solenoid actuating winding 93 connected in parallel with current limiter 30. During normal operation of the circuit the switch contacts 92 and 92' are closed so that on alternate half cycles when the supply terminal 90A is negative with respect to the supply terminal 90B, the smoothing network will be charged so that the filter capacitor 95 has the terminal thereof connected to the anode of diode 94 charged negatively. As a consequence a positive turn on potential will be supplied through limiting resistor 97 and blocking diode 112 to the control gate of triac 111. During the alternate half cycle the positive turn on potential is supplied from the smoothing capacitor 95' through the limiting resistor 97' and blocking diode 112' to the control gate of the triac 111. It will be appreciated therefore that during normal operation of the circuit, the triac 111 will be gated on in both directions during alternate half cycles of the alternating current supply potential to supply load current through the load 61.

For as long as the circuit operates normally, current will be supplied to the load 61 in the above described fashion. However, in the event of an overcurrent sufficient to vaporize the vaporizable conductor in the capillaries of the current limiter 30, current limiter 30 will immediately start to limit the current to some regulated low value. If it is desired to suppress the current immediately upon the occurrence of such an overcurrent, then the current limiter 30 should comprise a quenching current limiter. However, if desired the current limiter 30 may comprise only a regulating current limiter, and hence operates only to regulate the current through the device to a low value in the neighborhood of about 10% of its rated current. This operates to protect the circuit until the next current zero occurs immediately following the half cycle in which the overcurrent condition came into existence.

As described previously, when the current limiter 30 (whether it be a regulating current limiter or a quenching current limiter) is triggered into its vaporized current limiting mode of operation, it will immediately start to regulate the current to some low, safe value. Concurrently the current is diverted to the actuating winding 93 of the magnetic contactor mechanism 92, 92' and 93, which therefore will operate to open the contacts 92 and 92', these contacts remaining open thereafter until reset by manually operated means, not shown. By appropriate design, this can be made to occur prior to the next current zero. With the contacts 92 and 92' open, it is not possible to apply further energizing potentials to the gating circuits 91 and 91' during the next succeeding half cycles of the alternating current supply. Therefore, the triac 111 will not be triggered on during the succeeding half cycle and the circuit attains a permanent off condition in a manner similar to the circuit shown in FIGURE 10.

From the foregoing description, it can be appreciated that the invention provides a new and improved quenching current limiter of the vaporizable conductor type capable of reducing current flow through the device to an extremely low value, on the order of a few milliamperes, while being supplied from a conventional power source. It can be further appreciated that by the inclusion of such a new quenching current limiter device in circuit relationship with a thyristor, new fast response current-limiting circuit breaker arrangements are provided having greatly improved speeds of response, fewer moving parts, etc. Having described several embodiments of a new and improved increased quench current-limiter device and fast response current-limiting static circuit breakers employing such devices in conjunction with thyristors, it is believed obvious that other modifications and variations of of the invention are possible in the light of the above teachings.

What I claim as new and desired to secure by Letters Patent of the United States is:

1. Current limiting circuit interrupting means comprising:
   (a) electrical control means having a first main terminal, a second main terminal and a control gate terminal, said control means normally having a high impedance to current flow between said first and second main terminals, said control means having low impedance to current flow between said main terminals upon the application of a predetermined turn-on voltage between said control terminal and one of said main terminals, said control device retaining said low impedance to said current flow despite the absence of said turn-on voltage so long as said current flow exceeds a predetermined holding magnitude, said control means resuming said high impedance condition to said current flow upon the discontinuance of said current flow for a predetermined time in the absence of said turn-on voltage;

(b) a quenching current limiter connected in series circuit relation with said control means;

(c) said quenching current limiter comprising an enclosure having first and second terminals, a metallic conductor within said enclosure normally interconnecting said first and second terminals, said metallic conductor being vaporized by the passage of predetermined current therethrough and suddenly and substantially increasing its electrical impedance and reducing current in said circuit below said predetermined holding magnitude for a predetermined time sufficient to allow said gate to regain control of said control means; and (d) said conductor recondensing upon reduction of current therethrough and reestablishing a low impedance metallic connection between said first and second terminals.

2. A current limiting circuit interrupting device as set forth in claim 1 wherein said main terminals of said control means comprise an anode terminal and a cathode terminal and wherein said control means has high impedance to current flow in the direction from said cathode to said anode terminals at all times.

3. A current limiting circuit interrupting device as set forth in claim 1 wherein said control means is conductive in both directions between said main terminals upon the application of said turn-on voltage to said control terminal.

4. A current limiting circuit interrupting device as set forth in claim 1 wherein said quenching current limiter comprises a body of insulating material between said terminals of said limiter having at least one relatively small diameter opening extending therethrough, said metallic conductor completely filling said aperture and interconnecting said terminals.

5. A current limiting circuit interrupting device as set forth in claim 4 wherein said metallic conductor comprises mercury and wherein said quenching current limiter includes at least one expansion chamber connected to said opening for permitting temporary flow thereinto of a portion of said metallic conductor material to provide a prolonged zero current condition, said expansion chamber having at least one wall thereof resiliently distendable so as to cause said portion of said metallic conductor material to be thereafter returned from said chamber to its original position.

6. A current limiting circuit interrupting device as set forth in claim 1 wherein said device also comprises manually operable "on" and "off" switching means for causing said control device to assume said high and low impedance conditions selectively.

7. A current limiting circuit interrupting device as set forth in claim 1, said interrupting device also including manually operable "off" switching means comprising a commutating capacitor and manually operable switching means for electrically connecting said commutating capacitor electrically in parallel with said control device, said commutating capacitor being charged with a polarity such as to oppose the voltage drop across said control device thereby reducing said current through said control device to zero for a sufficient period of time to permit said control device to re-assume said high impedance condition.

8. A current limiting circuit interrupting device as set forth in claim 7, wherein said manually operable switching means for connectng said commutating capacitor in circuit comprises a gate controlled thyristor and manually operable switch means connected to said gate terminal of said thyristor.

9. A current limiting circuit interrupting device as set forth in claim 6 wherein said manually operable off switch means comprises a by-passing circuit by-passing current around said control device and said quenching current limiter, said by-passing circuit including a power transistor, and manually operable switch means for applying turn-on voltage to said power transistor.

10. A current limiting circuit interrupter as set forth in claim 1, said circuit interrupting device also including:

(a) a power thyristor connected electrically in parallel with said electrical control device and having a gate terminal;

(b) a gating transformer having its primary winding connected electrically in parallel with said quenching current limiter and having a secondary winding;

(c) means electrically connecting said transformer secondary winding to said thyristor gate terminal to turn said thyristor on upon the occurrence of predetermined voltage conditions in said gating transformer secondary winding, whereby upon the occurrence of excess current conditions through said quenching current limiter, a voltage is developed in said gating transformer secondary turning said power transistor on and by-passing current around said control means and placing said control means in non-conducting condition.

11. An alternating current limiting circuit interrupting device comprising:

(a) a pair of electrical control means, each of said electrical control means having a first main terminal, a second main terminal and a control gate terminal, each of said control means normally having a high impedance to current flow between said first and second main terminals in a first direction at all times and normally having a high impedance to current flow between said main terminals in a second direction opposite said first direction;

(b) each of said control means having low impedance to current flow between said main terminals upon the application of a predetermined turn-on voltage between said control terminal and one of said main terminals and retaining said low impedance despite the absence of said turn-on voltage so long as said current flow exceeds a predetermined magnitude and resuming said high impedance to said current flow upon the discontinuance of said current flow for a predetermined time in the absence of said turn-on voltage;

(c) a quenching current limiter connected electrically in series with each of said electrical control means to form first and second current paths, said first and second current paths being connected electrically in parallel and in opposite conducting relation;

(d) a turn-on gating circuit for each of said current paths, each of said turn-on gating circuits comprising a capacitor having a resistor connected electrically in parallel therewith and means connecting said capacitor electrically in series with a unidirectional conducting device to said voltage source, and means connecting one side of said capacitor to said control terminal of the respective electrical control devices whereby said first and second conductive paths are rendered conductive upon alternate half-cycles of said alternating current, and (e) a holding solenoid having a winding connected electrically in series with said parallel connected combination of said first and second conductive paths, (f) contact means controlled by said solenoid for disconnecting said circuit upon the occurrence of predetermined current conditions therethrough.

12. An alternating current limiting circuit interrupting device comprising:

(a) electrical control means having a first main terminal, a second main terminal and a control gate terminal, said control means normally having a high impedance to current flow between said first and second main terminals, said control means having low impedance to current flow between said main terminals upon the application of a predetermined turn-on voltage betwen said control terminal and one of said main terminals, said control device retaining said low impedance to said current flow despite the absence of said turn-on voltage so long as said current flow exceeds a predetermined magnitude, said control means resuming said high impedance condition to said current flow upon the discontinuance of said current flow for a predetermined time in the absence of said turn-on voltage;

(b) a quenching current limiter connected electrically in series with said control means, said quenching current limiter comprising an enclosure having first and second terminals, a metallic conductor within said enclosure normally interconnecting said first and second terminals, said metalic conductor being vaporized by the passage of predetermined current therethrough and suddenly and substantially increasing the electrical impedance between said first and second terminals and reducing current in said series circuit below said predetermined maximum for a predetermined time, said conductor recondensing upon reduction of current therethrough and reestablishing a low impedance metallic connection between said terminals of said current limiter;

(c) turn-on signal generating means for said electrical control means comprising a first capacitor and resistor combination connected electrically in parallel, said parallel combination being connected electrically in series with a unidirectional conducting device across a pair of power terminals for connection to a source of electric power;

(d) a second capacitor and resistor combination connected electrically in parallel, said parallel combination being connected electrically in series with a unidirectional conducting device across said power terminals, said second unidirectional conducting device conducting in a direction opposite to that of said first unidirectional conducting device;

(e) means connecting said first capacitor through a limiting resistor and blocking diode to said control gate of said control device, means connecting said second capacitor through a second limiting resistor and blocking diode to said control terminal of said electrical control means, whereby a positive turn-on voltage is applied to said control means on each half-cycle of alternating current;

(f) a pair of main power terminals;

(g) a solenoid having its winding connected electrically in parallel with said current limiter;

(h) first switch means connecting said first capacitor to one of said main power terminals;

(i) second switch means connecting said second capacitor to the other of said main power terminals; and (j) means operated by said solenoid winding for causing opening of said first and second switch means.

13. A quenching current limiter including in combination a main inelastic electric insulating member having at least one capillary opening formed therethrough, a pair of inelastic, electrically conducting terminal members disposed at opposite ends of said main insulating member so as to be electrically insulated one from the other and exposed to the ends of said opening respectively, one of said terminal members being in the form of an electrically conductive plug pressed into said main insulating member in a direction transverse to the longitudinal axis of said opening and having a pressure bleeding orifice formed therein providing access to said opening, the other of said terminal members being in the form of an electrically conductive plug having a threaded opening therein and secured to said main insulating member and having a channel formed therein extending between said threaded opening and one end of said capillary opening, a screw in said threaded opening closing the end of said opening opposite said one end, a distendable surface secured over a chamber formed in the end of said limiter adjacent said pressure bleeding orifice and communicating therewith, electrically conductive vaporizable material normally filling said threaded opening, said channel, said capillary opening, said pressure bleeding orifice, and said chamber when said surface is in non-distended position.

14. A current limiter according to claim 13 wherein said main insulating member is cylindrically shaped, said limiter also comprising a cup-shaped contact member telescoped over one end of said main insulating member, the bottom of said cup-shaped contact member forming said distendable surface.

15. A current limiter according to claim 14 wherein said cup shaped contact member is spaced away from the end of said cylindrically shaped insulating member by a steel ring and an O-ring seal so as to define said chamber.

16. A quenching current limiter device including in combination a main electrical insulating member having at least one capillary passageway formed therein, electrically conductive, physically inelastic terminal means secured on opposite sides of said main insulating member and electrically insulated one from the other, said capillary passageway extending through the main insulating member to each of said terminal means, said terminal means comprising electrically conductive terminal members having internally threaded openings therein communicating with said capilliary passageway, said limiter also comprising externally threaded, conductive screws threadably secured in said internally threaded openings in said terminal members respectively, an electrically conductive vaporizable material normally filling said capillary passageway, and the portions of said internally threaded openings in said terminal members not filled by said threaded screws, and means for providing electrical contact to each of said terminal members whereby the current limiter can be connected in electric circuit relationship with a source of energizing current.

17. A current limiter according to claim 16, said limiter also comprising a relatively thick walled, high strength steel jacket surrounding said main insulating member and electrically insulated from said terminal members.

18. A current limiter according to claim 17 wherein said main insulating member and surrounding steel jacket are cylindrically-shaped, said capillary passageway extends along the longitudinal axis of said main insulating member, said terminal members are aluminum plugs pressed into said main insulating member in axial alignment with the longitudinal axis thereof, said threaded screws are steel, and said vaporizable conductive material comprises mercury trapped under pressure by said threaded steel screws which are screwed into sealing engagement with said aluminum plug terminal members through the medium of sealing rings.

References Cited

UNITED STATES PATENTS

| | | | |
|---|---|---|---|
| 1,595,061 | 8/1926 | Valeriuc | 337—119 |
| 3,117,203 | 1/1964 | Hurtle | 337—119 |
| 3,238,418 | 3/1966 | Heft | 317—33 |

JOHN F. COUCH, *Primary Examiner.*

J. D. TRAMMELL, *Assistant Examiner.*

U.S. Cl. X.R.

307—202; 317—33; 337—119